Patented Nov. 4, 1941

2,261,228

UNITED STATES PATENT OFFICE 2,261,228

METHOD OF APPLYING HARD FACING TO TOOLS

Herbert L. Cockrum, Houston, Tex., assignor to Hughes Tool Company, Houston, Tex., a corporation of Delaware No Drawing. Application September 25, 1939, Serial No. 296,393

2 Claims. (Cl. 76—101)

My invention relates to the application of hard wear resisting facing to tools.

It is a common practice in the making of tools subject to abrasion and heavy wear in use, to apply a hard facing material, such as tungsten carbide, along the surface of the tool subject to wear. Shovels, scrapers, earth boring drills and the like will function for a materially longer period without becoming worn out, when thus treated, than they will without such facing.

The method of applying the hard facing at the present time normally includes the sticking of particles of tungsten carbide, or other hard material, to the wear surface to be protected by means of an adhesive material which forms a flux in the application of heat thereto. Sodium silicate is commonly used as such an adhesive. The atomic hydrogen torch is then used to heat the surface thus treated until the surface of the tool is slightly fused so that the surfaces of the tungsten carbide particles are wetted by the molten steel and surface tension causes the particles to be partly surrounded and embedded in the metal of the tool surface. Due to the hydrogen atmosphere, no oxidation takes place and each particle of the hard material is bonded to the surface of the tool. This procedure is objectionable because of the consumption of time and labor necessary in carrying out the process, which makes it expensive and furthermore the results depend upon the skill of the operator of the torch and hence are not uniform.

It is an object of the present invention to apply the hard facing without the use of a torch or other hand operating heating means and to bond the particles of hard material to the tool by the application of heat to a large number of tools simultaneously.

I desire to employ an alloy of metals, fusing at a temperature lower than the fusing point of steel, to attach the hard material of high melting point to the tool.

In carrying out this process I form the cutter or other tool in the desired shape. I then apply thereto a layer of the tungsten carbide or other hard particles mixed with one or more metallic powders such as iron and carbon alloys, copper, boron, silicon and nickel or alloys of iron with copper, boron, silicon, nickel, and the like. The materials are formed into a paste with flux such as sodium silicate. This paste is spread in the desired amount upon the surface to be hard faced and the tool is then subjected to heat in a furnace at about 1800° F. to 2350° F. until the metal powders have been fused and form, with the surface of the steel, an alloy which wets the surface of the hard particles and causes them to adhere to the steel of the tool. The heating is done in an atmosphere of hydrogen so as to prevent oxidation. Ferrous alloys containing a sufficient amount of carbon will fuse at a temperature materially lower than the melting point of the steel in the tool and thus form a good binder. Obviously a larger number of tools may be surfaced with the paste and subjected to the desired temperature in a furnace at one operation, thus materially reducing the amount of labor necessary.

While copper, silicon, boron and nickel have been suggested as proper metal powders to be employed in alloying with the steel and bonding the hard particles to the tool surface, other metals may be substituted. Zinc or silver will serve instead, the object being to provide metal powders which will fuse together and alloy with the steel of the tool at a temperature below the melting point of the steel itself. Alloys of iron and carbon are, however, preferable in most circumstances. The hard particles, which will not fuse at temperatures below 4000° F. may thus be welded to the surface of the steel tool and a satisfactory hard facing obtained without the use of a torch or electric arc.

The advantages of this process are uniformity of results and cheapness of operation. Hand welding which is a large item of expense in the usual hard facing method of operation will be eliminated.

What I claim is:

1. A method of hard facing tools including, forming a paste of the particles of hard facing material by mixing therewith a small quantity of an alloy of iron and copper in powdered form and a flux in sodium silicate, applying said paste to the tool surface and submitting the tools to a temperature materially lower than the melting point of said hard material, but within the fusing point of copper.

2. A method of hard facing steel tools including spreading upon the surface to be covered a paste made up of a flux, a comparatively low melting point metal within the range of 1800° to 2200° F. in powdered form and particles of tungsten carbide, then placing said tools in a furnace and raising the temperature to about 2200° F. and bonding said particles to said tools.

HERBERT L. COCKRUM.